United States Patent
Puretz (10) Patent No.: US 6,368,203 B1
(45) Date of Patent: Apr. 9, 2002

(54) METHOD FOR SCALING FRESH FISH AND REMOVING ITS INTERNAL ORGANS AND DEVICE FOR IMPLEMENTATION OF THE OFFERED METHOD

(75) Inventor: Avrohom Puretz, Jerusalem (IL)

(73) Assignee: Jersey Global International SA, Brussels (BE)

( * ) Notice: Subject to any disclaimer, the term of this patent is extended or adjusted under 35 U.S.C. 154(b) by 0 days.

(21) Appl. No.: 09/665,320

(22) Filed: Sep. 19, 2000

Related U.S. Application Data (60) Provisional application No. 60/175,961, filed on Jan. 13, 2000.

(51) Int. Cl.⁷ ............................................... A22C 21/02
(52) U.S. Cl. ......................... 452/81; 452/121; 452/123
(58) Field of Search ............................. 452/81, 77, 76, 452/98, 99, 106, 109, 110, 121, 123, 173

(56) References Cited

U.S. PATENT DOCUMENTS

| | | | | |
|---|---|---|---|---|
| 2,993,227 A | * | 7/1961 | Couret | 452/81 |
| 3,707,019 A | | 12/1972 | Wiggins | |
| 3,751,765 A | | 8/1973 | Reeves et al. | |
| 4,091,506 A | | 5/1978 | Soerensen et al. | |
| 4,195,387 A | | 4/1980 | Iwase | |
| 4,535,509 A | | 8/1985 | Bullock et al. | |
| 4,815,167 A | * | 3/1989 | Emanuelsen | 452/121 |
| 4,837,898 A | | 6/1989 | Hartmann et al. | |
| 4,856,145 A | * | 8/1989 | Behnk et al. | 452/121 |
| 4,976,010 A | | 12/1990 | Lavelle, Jr. | 452/116 |
| 5,184,973 A | | 2/1993 | Orlando et al. | 452/125 |
| 5,197,916 A | | 3/1993 | Orlando et al. | 452/125 |
| 5,413,524 A | * | 5/1995 | Yoshida | 452/106 |
| 5,628,680 A | | 5/1997 | Hjorth | 452/106 |

FOREIGN PATENT DOCUMENTS

| | | |
|---|---|---|
| JP | 6339336 | 12/1994 |
| WO | WO 98/12929 | 4/1998 |

* cited by examiner

*Primary Examiner*—Peter M. Poon
*Assistant Examiner*—Floris C Copier
(74) *Attorney, Agent, or Firm*—Blank Rome Comisky & McCauley LLP (57) ABSTRACT

A fish is scaled, and its internal organs removed, by continuously advancing the fish along a treatment path while simultaneously exposing the fish body to high-pressure water jets. During treatment the fish is positioned vertically, with the belly downwards. The forces required for holding and transporting the fish are applied laterally to the upper part of the fish body, which is harder, without touching the belly area, which is soft and therefore is left free. The descaled fish proceeds to a position for cutting the belly area and removing the internal organs. The treatment is carried out in the same devices efficiently and without deterioration of the gustatory properties.

18 Claims, 8 Drawing Sheets

METHOD FOR SCALING FRESH FISH AND REMOVING ITS INTERNAL ORGANS AND DEVICE FOR IMPLEMENTATION OF THE OFFERED METHOD

This application claims benefit of Provisional No. 60/175,961 filed Jan. 13, 2000.

FIELD OF INVENTION

The proposed invention is pertinent to the technology and equipment for the treatment of fresh fish and can be applied in the branches of fish industry, in the sphere of marketing and public catering.

BACKGROUND OF THE INVENTION

To the present day a technology and, consequently, a machine do not exist that would allow to combine together the process of high-quality scaling of fish and the process of removing internal organs, to bring these processes together in time, and thus create possibility of combining these two usually separate operations into one, which substantially improves consumer qualities of goods. The given invention offers a new method for fish scaling and removal of internal organs, as well as a machine for its implementation and is directed just at elimination of the above-indicated deficiency.

Known are various methods and devices for fish scaling, for the removal of internal organs but alternately, on various machines and by different methods.

So, for scaling most often the brushes rotating at different angles to the fish surface are used as a tool (U.S. Pat. Nos. 5197916, 5184973), which is made from various materials. Relatively successfully this method can be used for scaling frozen fish. When treating fresh fish, its skin can be damaged, thin and fine tissues of abdominal cavity can be ruptured or internal organs can badly traumatized which results in upsetting gustatory properties.

Therefore, for scaling fresh fish these methods are not applied in order to preserve gustatory properties.

With the aim of more qualitative scaling, a patent of Japan has been offered (JP No. 6339336), where it is proposed to use a compressed air jet for that.

This method cannot have wide application in connection with a substantial rise in price of technology, owing to the usage of powerful compressors and the most expensive type of energy i.e. compressed air.

Inventions are available offering to use water jets under high pressure for scaling fish.

For example, Japanese Patent JP No. 4228023 offers to remove scale by means of water jets through elongated rectilinear slits with their length exceeding the maximum width of the treated fish. In this case the author offers, in order to maintain gustatory properties, to remove entrails in advance, on another machine, since the existing methods and devices for a conveyer transportation of fish in the course of scaling do not provide for safety of fish internal organs.

JP No. 4228023 which applies water jets under high pressure as a tool for scaling is closest to our invention, since it can offer the highest quality of treatment. However, the Japanese '023 patent indicated above does not use all the potentialities of the fishscaling method by means of water jets. So, the method proposed by the Japanese '023 patent infers such a sequence of operations, which does not provide for a satisfactory quality of scaling.

Firstly, the Japanese devices anticipates removing entrails prior to scaling. In this case it is practically impossible the cut fish belly to be scaled with a water jet, due to loss of elasticity and resistivity of these parts of the body.

Secondly, the elongated rectilinear nozzle shape offered by the Japanese '023 patent also will not provide for scaling quality because various parts of the fish body require different modes of operation with water jets (different angles of jet inclination, different distances from the nozzle to the surface to be treated etc.) in the course of treatment. Under the conditions when throughout the whole fish width the jet supplied from one nozzle is operating, it is not possible to provide for a reliable and high-quality scaling on all portions of the fish body.

Thirdly, the method of fixing and moving the fish in the process of treatment of the Japanese '023 patent does not allow protecting the fish belly from being squeezed by the transportation elements and, as a result, cannot guarantee retention of gustatory properties. Therefore the Japanese patent would be forced to offer to scale the entrails.

But in the Japanese '023 patent no satisfactory method of fixing and transportation of the fish is available. Not a single one out of the considered patents solves this problem. Basically, the fish is secured and moved flatwise (patents of U.S. Pat. Nos. 5628680, 5197916, patents of Japan JP 4228023, JP 4837898) or on its back, with belly upwards (patents of U.S. Pat. Nos. 4091506, 4837898). Due to different width of the treated fish and with the transportation mechanism width being constant, some cases may occur when the fish belly is oversqueezed by the mechanisms.

So, if the fish is moving flatwise, then in case there is some fish of small width, the holding and transportation elements oversqueeze the belly damaging or destroying those entrails that can deteriorate the gustatory properties.

The same happens in those cases when the fish is held and transported with belly up basing on its back. Thus, though the prototype method and device according to patent JP 4228023 use high-pressure water jets for the fish scaling, just the same it has very essential drawbacks noted above.

Consequently, we can draw the conclusion that for the time being no method or machine are available where the fish scaling and removal of its entrails could be performed together, in one operation, using water jets. Since no method of reliable, qualitative and productive fish scaling is known, the removal of the entrails is performed on separate machines and devices, and very often it is done in combination with high pressure water jets (patents of U.S. Pat. Nos. 4837898,4535509, WO 9812929). These separate operations are performed prior to the fish scaling and very often they are even left to be done by the customer.

OBJECTS AND SUMMARY OF THE INVENTION

Figure 1:
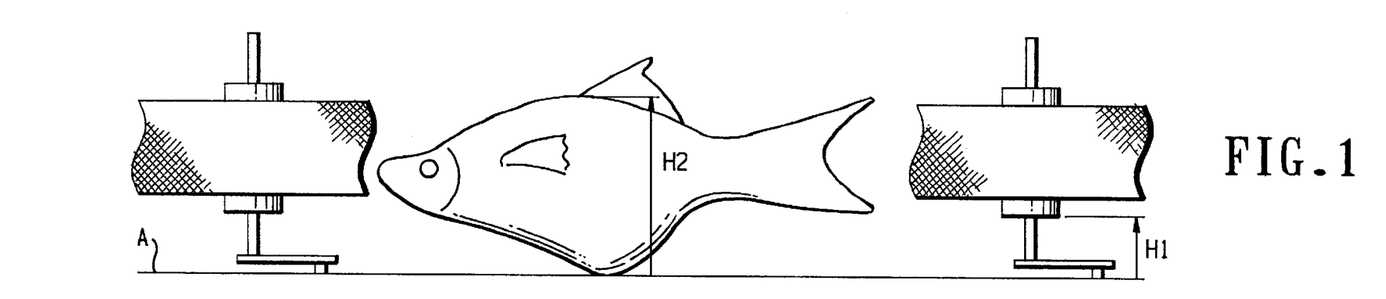
FIG. 1. Schematic representation of the displacement of fish to be cleaned according to the present invention.
Figure 2A:
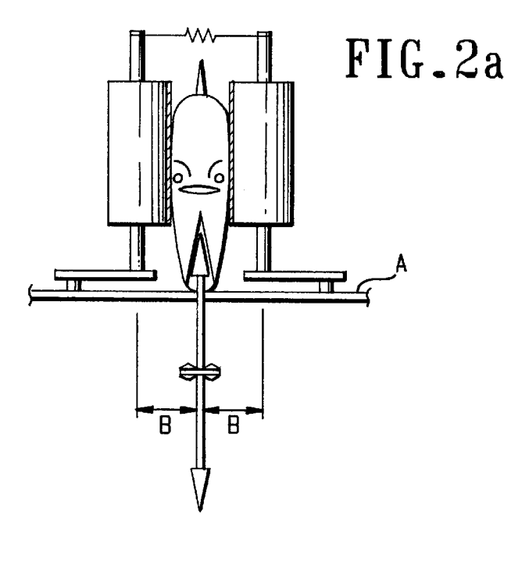
FIG. 2a,b. Schematic representation of the displacement of fish in the area of cutting the belly.
Figure 2B:
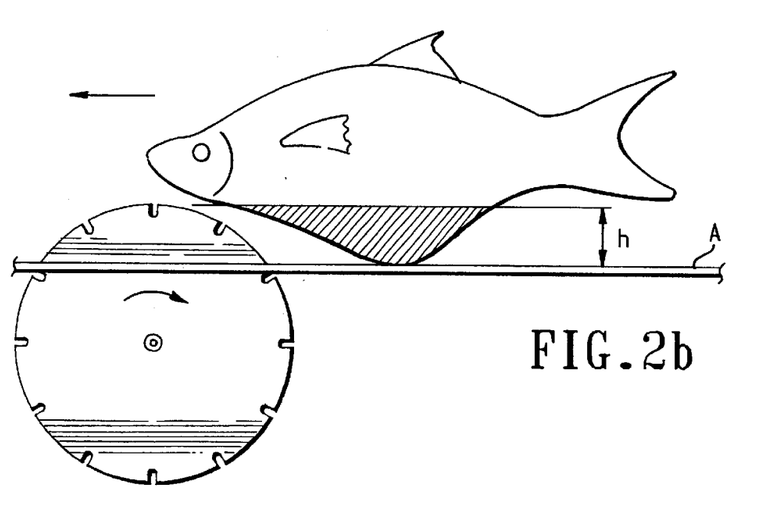
Figure 2C:
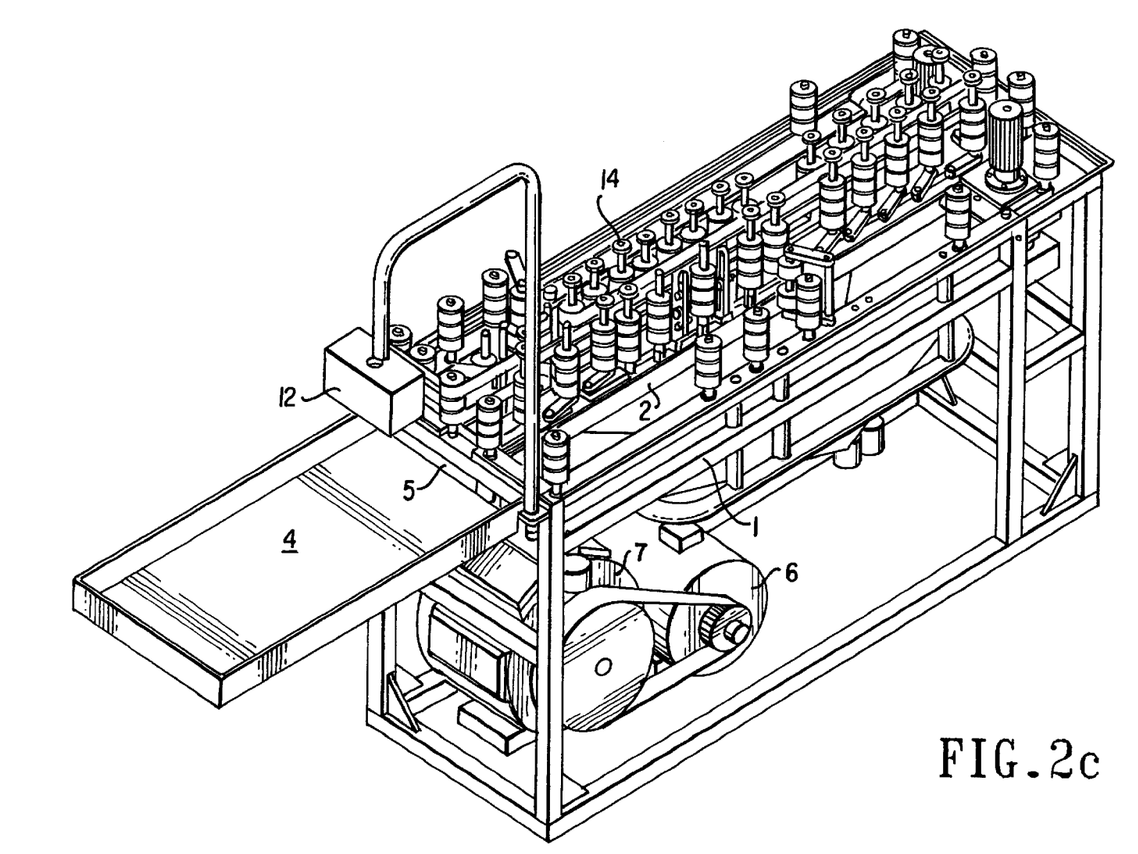
FIG. 2c. Isometric representation of the proposed device for the fish scaling and removal of internal organs.

The method of the present invention of scaling fresh fish by means of the high pressure water jets is free from the above listed drawbacks, and allows to create a high-quality treatment technology and machine for fish scaling and entrails removal. Distinctive features and essence of the present method comprise the following:

a. Fish scaling and removal of internal organs from abdominal cavity using high-pressure water jets is performed by placing the fish vertically, with the belly downwards. In so doing and for holding and displacing the fish, the forces are applied to the upper part of its body, which is harder, without touching the belly area, which is left free. It is attained by that: prior to the fish treatment, it is based to the lower surface of the belly with respect to some reference surface A (FIG. 1) and clamping and transportation elements are located at some distance H1sufficient for that even with the maximum fish width (H2=max.) the area of the belly would not touch the clamping device. In this case this condition is also met for smaller fish. Such a system of the fish basing in the course of the treatment process allows avoiding traumatizing its internal organs and retaining gustatory properties irrespective of the treated and transported fish size.

b. The most rational sequence of technological transitions is offered: in the beginning, the whole fish surface is scaled and then the belly is cut and internal organs removed including kidneys (the so called "blood spots"). By the application of this sequence of operations, the quality of the abdomen cavity scaling is improved (as compared with the prototype) when the fish is supplied for scaling in disemboweled condition. After scaling, the belly surface loses elastic properties and practically is not susceptible to scaling.

c. The scaling is done throughout the whole width of the fish surface not simultaneously but in turn, by separate zones (selectively). This distinctive feature of the method is explained by that various zones of the fish surface have different size of scale and different adhesive forces with the skin. Therefore the offered method provides for the treatment of various sections of the fish surface by means of the nozzles located at different inclinations to the fish body surface and located at various distances from the treated surface sections. In this case a geometry of the nozzle chosen is such as to provide for a flat fan-shaped jet. Owing to this, the fish scaling quality substantially increases in comparison with the known analogues and the prototype.

d. After scaling, the fish is supplied to the site for removing internal organs and is oriented in such a way, that the fish body is centered precisely with respect to the knife cutting edge axis (FIG. 2a). In this case the upper part of the cutting edge h is always placed at a preset distance h from base surface A of the transportation system (FIG. 2a,b). This kind of technology of the fish basing before removing the entrails allows to improve substantially the cleaning properties of the internal cavity owing to the fact that the cutting edge can be precisely set up with respect to the lower part of the body reasoning from that the thickness of that part of the body which is necessarily to be cut. In so doing, the knife is set up so that, on the one hand, under no circumstances the cutting edge should damage those fish organs which could cause change in its gustatory properties and, on the other hand, would provide the mandatory cutting of the fish anus where a part of the entrails is held. Besides, the cleaning quality of the internal abdominal cavity increases due to the fact that while cutting with the belly being downwards, an additional possibility emerges for better removal of the entrails and washing of the abdominal cavity owing to ordinary gravitation. In this case the probability of some remains of the removed organs and dirty liquid being held up in the internal cavity sharply decreases.

On the basis of the above stated distinctive features of the new technology for the fish cleaning, a new method of cleaning and a machine for this technology implementation are offered.

BRIEF DESCRIPTION OF THE DRAWINGS

The present invention will now be described in greater detail with references to the drawings.

DETAILED DESCRIPTION OF THE PREFERRED EMBODIMENTS (BEST MODE)

Figure 3A:
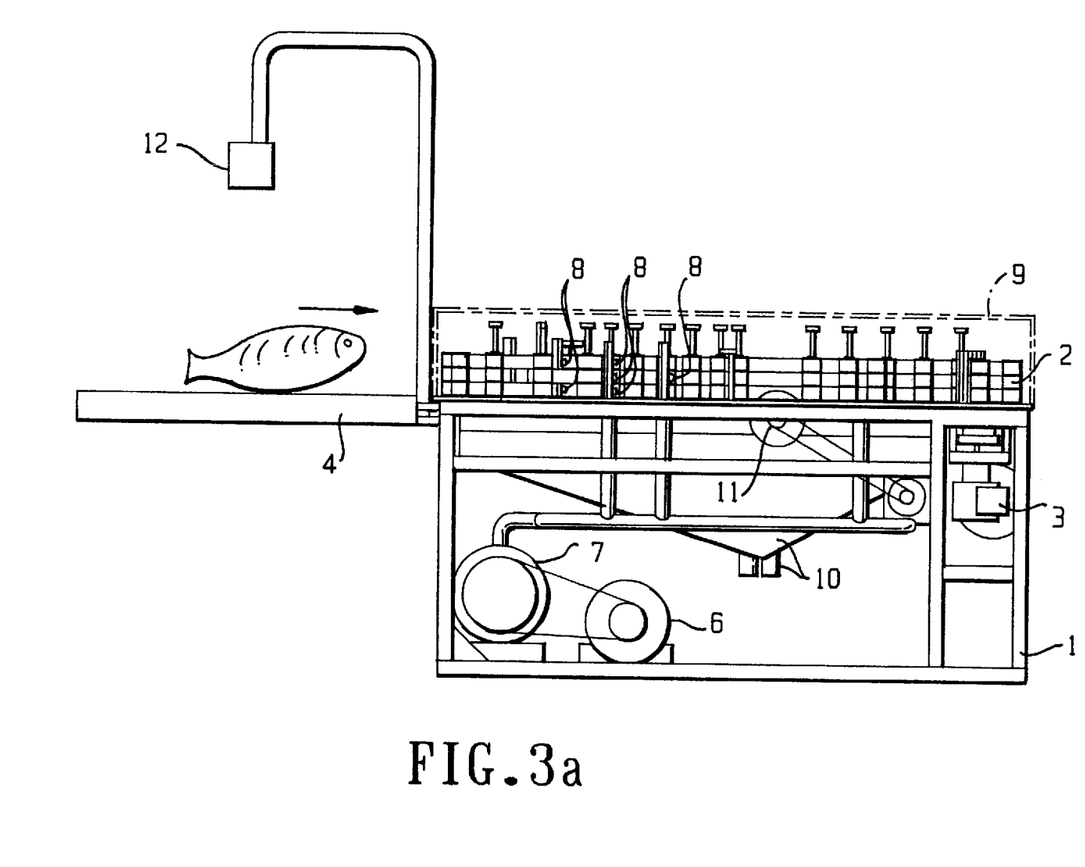
FIG. 3a,b. Side views, respectively and front view of the device represented in FIG. 2c.
Figure 3B:
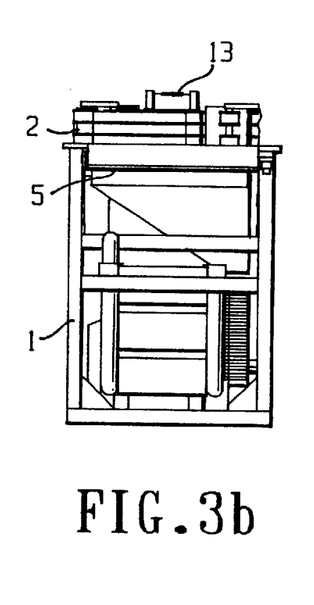
Figure 4A:
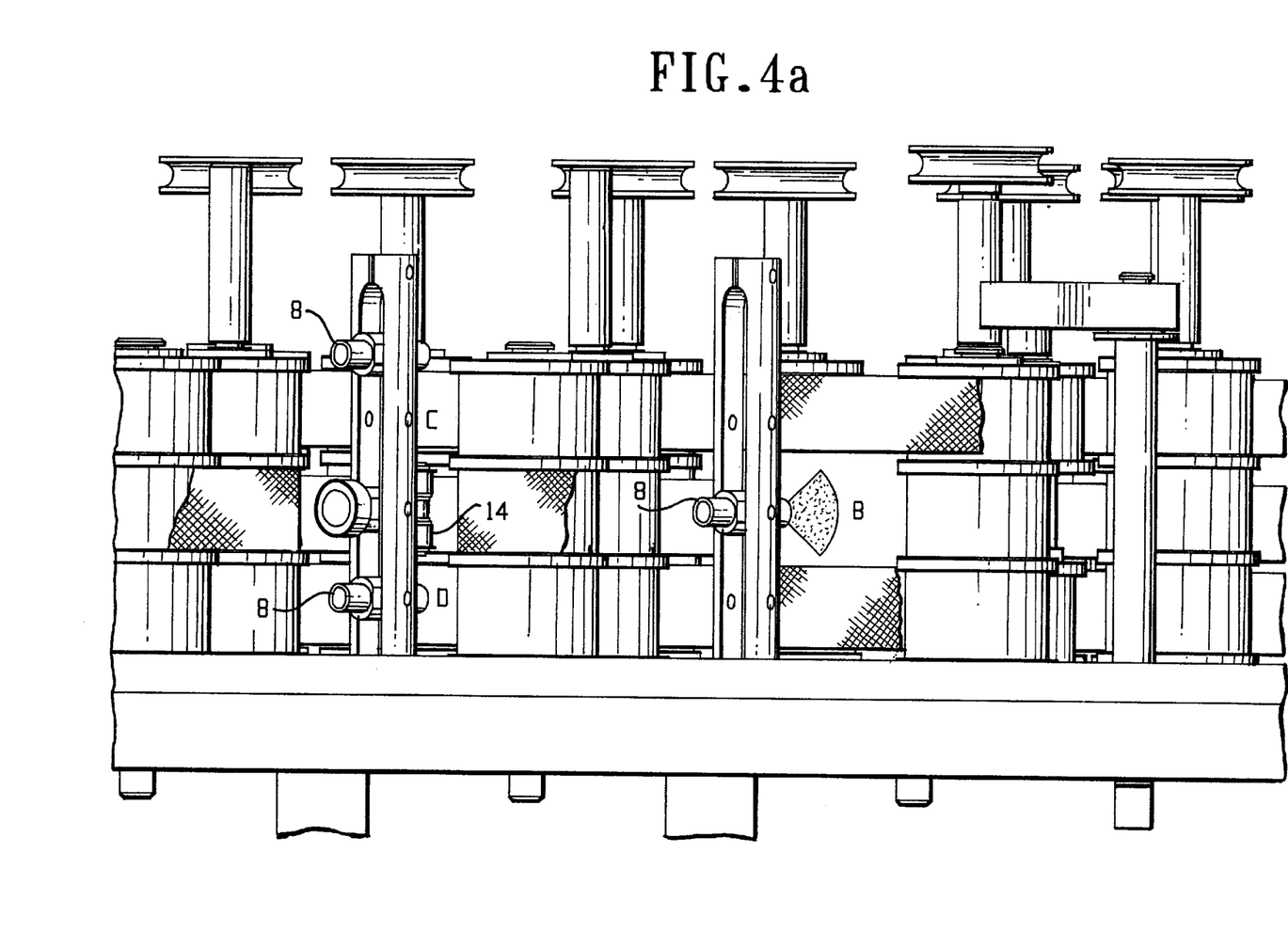
FIG. 4a. Magnified representation of one of the areas of the fish scaling.

The proposed device comprises (FIG. 3): stand 1 on which band conveyer 2 with drive 3 are mounted, receiving tray 4 with basing foundation of conveyer 5, drive of pump 6, high pressure pump 7 for creating water jets through nozzles 8, system of guard 9, system of drain and removal of waste materials 10, device 11 for cutting the belly and entrails removal, control system 12, elastic elements 13 for bringing together distance-type rollers 14. The machine operates in the following way: the fish is manually (or from an automatic loader) supplied one by one, vertically, with the belly being downwards and head forward, to receiving tray 4 of band conveyer 2 driven by drive 3. The lower surface of the fish body touches basing foundation 5. High-pressure pump 7 with drive 6 provides for 14–16 bar-pressure to supply water through nozzles 8 mounted in various areas of treatment. Casing 9 provides for reliable protection from splashing and system of drain 10 allows removing waste materials. The belts of the band conveyer envelope the hard parts of the fish body so, that when the fish starts moving, central zone B (FIG. 4a) is left between the tightening belts, which is open for water treatment by jets on one side of the fish, and from the opposite side—two zones: C and D (the upper and lower zones).

As just noted, the lower surface of the fish body touches the basing foundation 5. Thus, the basing foundation 5 provides a reference plane A against on which the fish is positioned. As shown in the figures, the longitudinal middle plane of the fish body is perpendicular to the reference plane A.

Figure 4B:
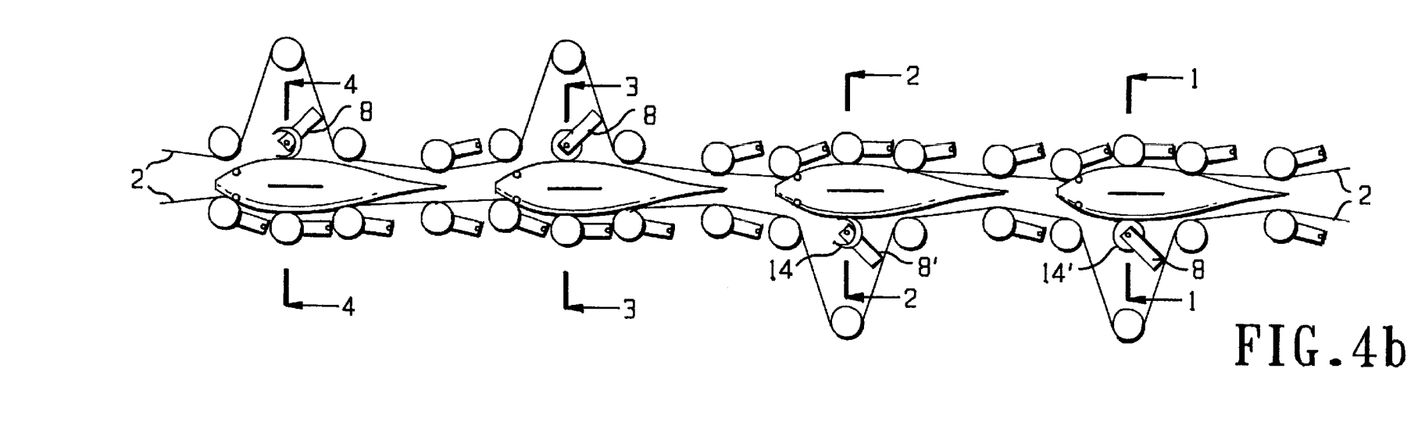
FIG. 4b. Top view of the area for the fish scaling.
Figure 4C:
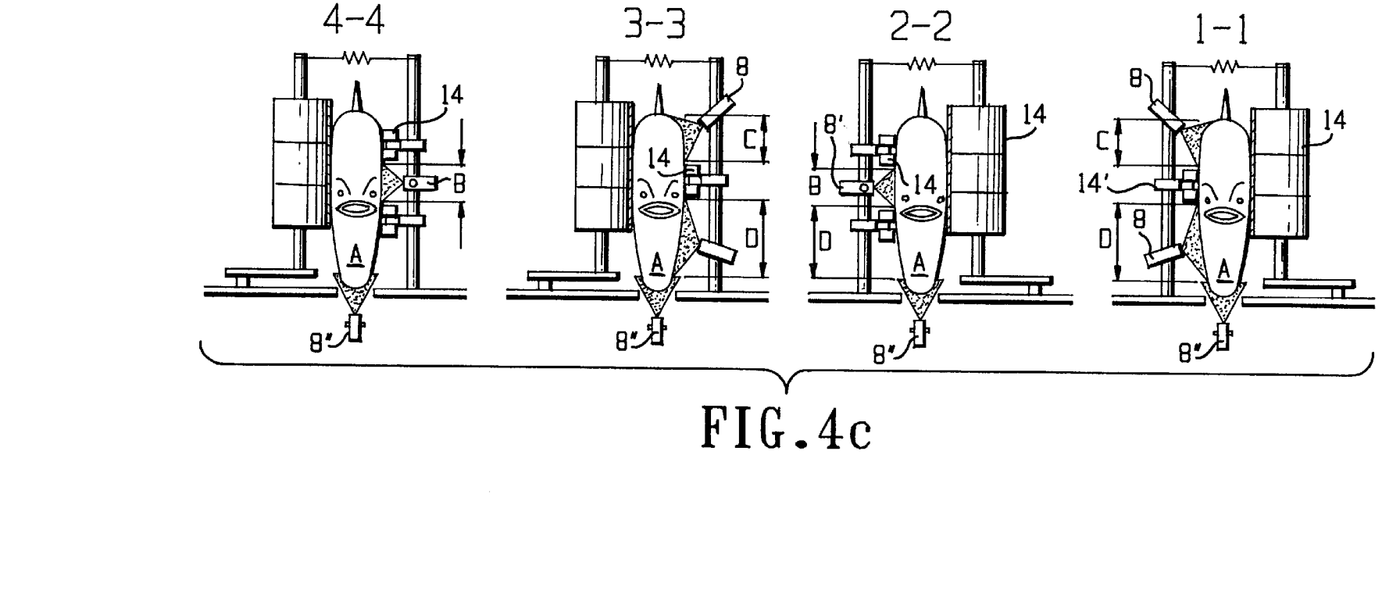
FIG. 4c. Sections 1-1, 2-2, 3-3, 4-4 of the area represented in FIG. 4b.

The above mentioned can be illustrated by FIGS. 4b and 4c, in which it is seen that the belt of conveyer 2 in area 1 is spaced from the fish body on its left side (motion-wise), and roller 14' touches only the middle part of the fish body. From the opposite side rollers 14 touch the fish body throughout the whole height. In the space between the band and the fish body, upper and lower nozzles 8 are mounted, which direct water jet under pressure to the top and bottom parts C, D of the fish body. The middle part of this side of the fish body is not treated for the time being, since it is occupied by middle roller 14'. The fish is gripped between the bands of the right and left conveyers due to elastic element 13. Having passed area 1-1, the fish proceeds to area 2-2, where the conveyer band is also spaced from the fish body, and in the space between the fish and band, nozzle 8' is mounted, which is between upper and lower rollers 14, and as a result can direct the water jet to middle area 13 which has not been treated for the time being. From the opposite side, throughout the whole height, hold-down rollers 14 touch the fish body as before. Once the treatment of the whole left side of the fish body has been finished, the fish proceeds to area 3-3, where at first upper left area C and lower left area D are treated, and then—to area 4-4, where the middle area of the fish body is treated. The treatment is performed owing to the design of the right band of the conveyer, rollers and nozzles being similar in design of the same elements of the left side, as was described above. In the course of the fish displacement from area 1-1 to area 4-4, water jet is likewise supplied to the lower part of the fish body from the bottom, through nozzles 8".

The fish are moving along the length of the conveyer uninterruptedly, one after another, and since all the nozzles are operating simultaneously several fish are cleaned at a time.

Figure 5:
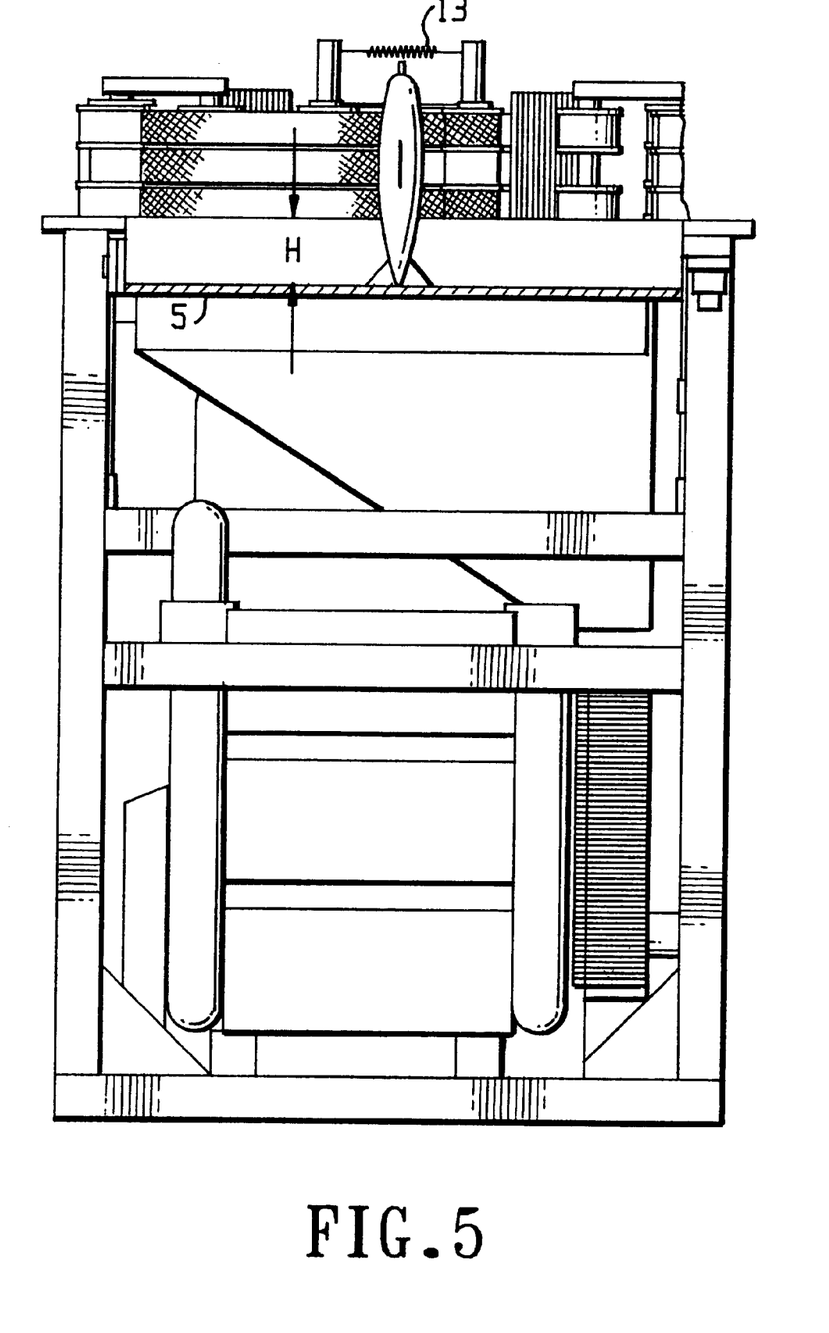
FIG. 5. Magnified representation of the proposed device front view.

From FIG. 5 it is seen that since the fish is spaced from the conveyer foundation by H height, the lower part of the fish body is open and therefore the area under belly is well washed around by water jet supplied from the bottom. Besides, such arrangement of the fish provides for touching the fish body and its compression by the right and left conveyer bands over the hard tissues only. The holding-down force chosen is sufficient for a reliable moving of the fish, without puncturing tissues, which is provided by a correct choice of the elastic element. In practice the optimal hold-down force amounts to 2 kg on either side.

Figure 4D:
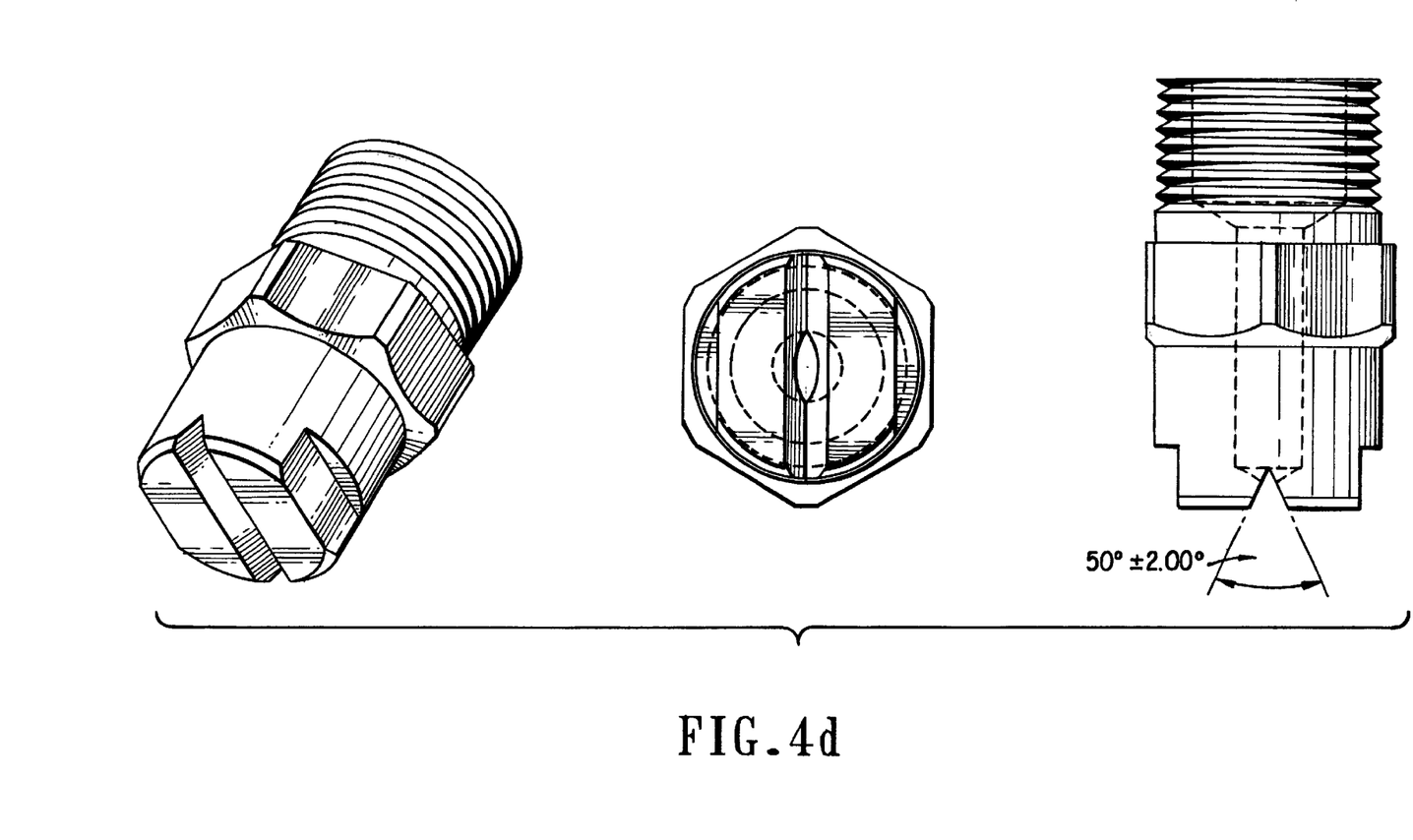
FIG. 4d. Representation of the nozzle for supplying water under pressure to be used in the proposed device.

Now, referring to FIG. 4*d* we are going to explain the nozzle design used in the proposed device. The nozzle is made in the form of a cylindrical bushing and is fitted with a longitudinal hole ending on one side by a V-shaped slit. The slit angle and internal hole diameter are chosen so that the water jet would provide a reliable scaling. Practically, for a jet supplied under 14-16-bar pressure the internal hole diameter shall be 3 mm and slit angle 50+−2 deg.

Owing to such a design, a flat fan-shaped jet, which efficiently removes the scale. The nozzles are mounted in such a way, that the supplied jets would overlap the treatment zones. The distance between the nozzles and the fish surface is established optimal and maintained constant by means of distance rollers 14, irrespective of the fish thickness.

Having passed scaling, the fish by means of the same conveyer is supplied to the site for the removal of internal organs as is shown in FIG. 4. All the time the fish is moving over base surface 1. In this case rollers 22 of lever synchronizer 20 align the fish before it approaches rotating cutting knife 33. Owing to this, provision is made for a permanent location of the fish belly along the longitudinal axis of the area, where the internal organs are removed and, apart from this, the anus cutting is guaranteed. In the lower part of the cutting area two nozzles 44 are standing, through which water for cleaning the belly and outwash of entrails is supplied.

Figure 4E:
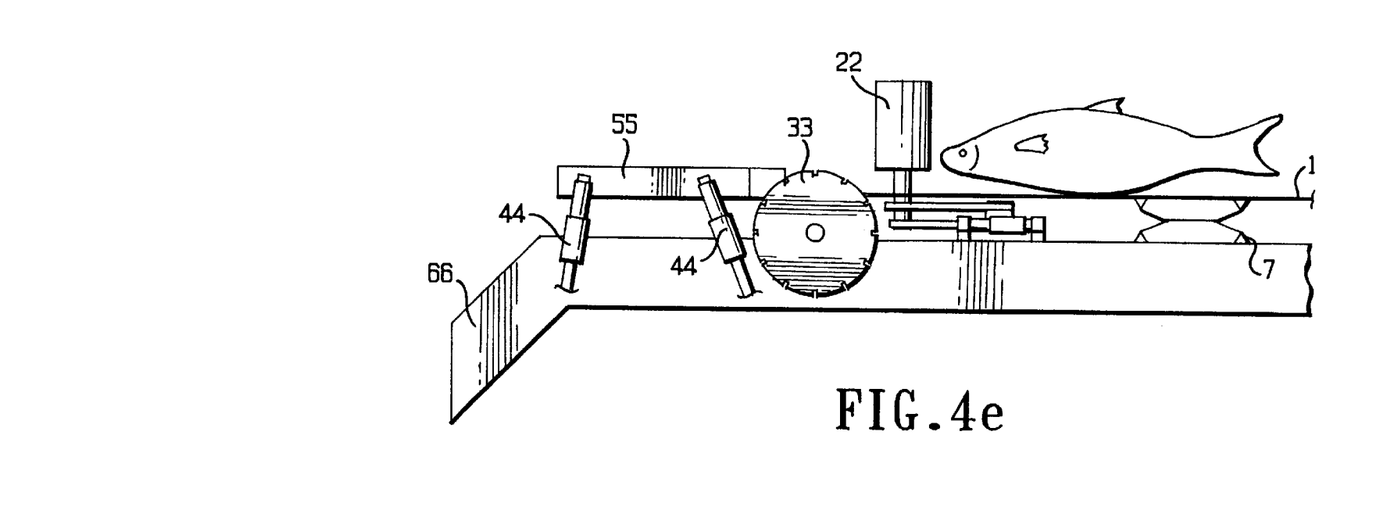
FIG. 4e. Side-view of the area for cutting the belly.
Figure 4F:
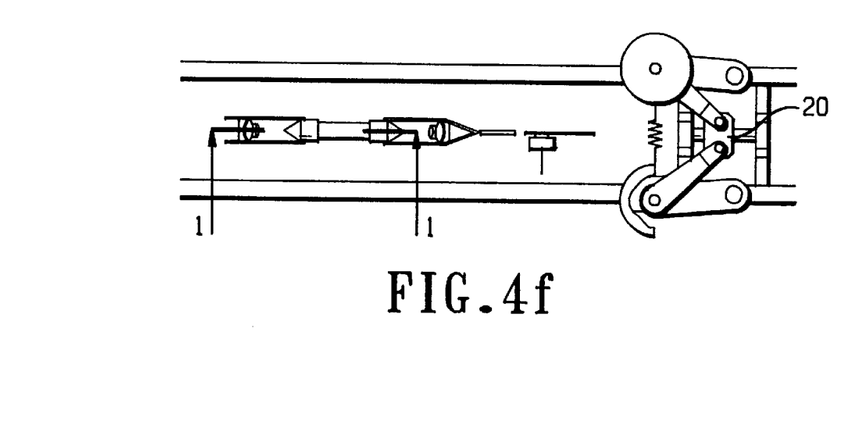
FIG. 4f. Topview of the area for cutting the belly.
Figure 4G:
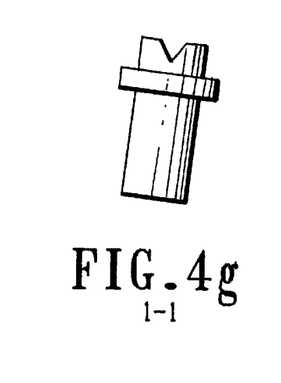
FIG. 4g. Cross-section of 1-1 view represented in FIG. 4f.

With further displacement and after cutting the belly tissues the fish is moving by means of the band of conveyer 55 and arrives at a fixed conical metal expander 50, which forces the cut belly walls apart and makes it possible for the nozzles to remove the fish entrails more fully by means of water jets. This is also facilitated by that the alignment guarantees the cutting of anus, where a great part of entrails is held up. Nozzles 44 are directed to the treatment surface at a small inclination, facing one another.

The apparatus and method for cleaning the internal abdominal cavity of according to the present invention provides for a high quality of cleaning, and the vertical arrangement of fishes with the open belly downwards guarantees full cleaning of the treated cavities. The fish arrives in tray 6 being clean, without remains of dirty liquid inside the abdominal cavity.

The foregoing description and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A device for scaling a fish and cleaning internal organs of the fish by means of high pressure water jets, said device comprising:
    a) a supporting frame defining a treatment path along which the fish proceeds from a scaling position to a position for removing the internal organs,
    b) an endless conveyor for advancing the fish along the treatment path, wherein the fish is positioned during transportation with its belly area downwards, the endless conveyor having two opposite branches arranged at lateral sides of the treatment path to transport the fish along the treatment path, in which each of the branches of the endless conveyor comprises three parallel belts and corresponding guiding rollers for directing respective ones of the parallel belts, said rollers being located in such a manner that one lateral side of the fish body is always in frictional engagement either with one or with two belts of one branch, while the opposite lateral side of the fish body is in frictional engagement with all three belts of the opposite branch, room is provided between the fish body and those belts which are not in frictional engagement with the fish body, said room being sufficient for deployment of at least one nozzle for directing a high-pressure water jet to the corresponding lateral side of the fish body;
    c) a water jet delivery means for producing high-pressure water jets and directing the jets to the fish body; and
    d) a cutting means for cutting the belly area to enable evacuation of the internal organs.

2. The device of claim 1, in which said water jet delivery means comprises a pump and a plurality of nozzles for directing the water jets separately to various zones of the fish body.

3. The device of claim 2, wherein the endless conveyor further comprises a spring means for maintaining constant distance between the opposite belts, said spring means being sufficient to exert a lateral force on each fish side sufficient for frictional engagement and advancing of the fish along the treatment path without damaging the fish body tissues.

4. The device of claim 2, in which said nozzles are configured to provide jet discharge in the form of a flat fan-shaped flow.

5. The device of claim 1, wherein the cutting means comprises a cutting disc and an alignment mechanism for aligning a middle longitudinal plane of the fish body with a plane of the cutting disc.

6. The device of claim 1, further comprising a reference plane on which the endless conveyor positions the fish.

7. A method for scaling a fish and removing internal organs of the fish, in which the fish is advanced in a longitudinal direction along a treatment path while a body of the fish is exposed to water jets, said method comprising:

a) positioning the fish on (i) the treatment path with its belly being downwards and its head forward and on (ii) a reference plane while the longitudinal middle plane of the fish body being perpendicular to the reference plane;

b) applying lateral forces substantially to the upper part of the fish body to enable holding the fish and its advancement along the treatment path, said step of applying being performed with an endless conveyor for advancing the fish along the treatment path, wherein the fish is positioned during transportation with its belly area downwards, the endless conveyor having two opposite branches arranged at lateral sides of the treatment path to transport the fish along the treatment path, in which each of the branches of the endless conveyor comprises three parallel belts and corresponding guiding rollers for directing respective ones of the parallel belts, said rollers being located in such a manner that one lateral side of the fish body is always in frictional engagement either with one or with two belts of one branch, while the opposite lateral side of the fish body Is In frictional engagement with all three belts of the opposite branch, room is provided between the fish body and those belts which are not in frictional engagement with the fish body, said room being sufficient for deployment of at least one nozzle for directing a high-pressure water jet to the corresponding lateral side of the fish body; and c) scaling the fish and removing the internal organs of the fish.

8. The method of claim 7, in which a level of said reference plane is selected to prevent applying lateral forces to the belly area.

9. The method of claim 7, comprising successively advancing the fish from a scaling position to a position for removing internal organs.

10. The method of claim 9, wherein step (c) comprises cutting the belly area in a position for removing internal organs.

11. The method of claim 8, wherein step (c) comprises exposing the lateral sides of the fish body to high-pressure water jets.

12. The method of claim 11, in which said high-pressure water jets are delivered under a pressure of 14-16 bar.

13. The method of claim 12, in which the lateral sides of the fish body are not exposed to said high-pressure water jets simultaneously.

14. The method of claim 13, in which one lateral side of the fish body is exposed to high-pressure water jets only after completing treatment of the opposite lateral side.

15. The method of claim 14, comprising directing said high-pressure water jets separately to various zones of each lateral side.

16. The method of claim 11, wherein step (c) comprises exposing the belly area to water jets.

17. The method of claim 10, wherein the belly area is cut with a cutting disc, and wherein step (c) comprises aligning a longitudinal middle plane of the fish body with a plane of the cutting disc.

18. The method of claim 10, wherein walls of the belly are forced apart to facilitate evacuation of the internal organs.

* * * * *